(12) United States Patent
Kuroda et al.

(10) Patent No.: US 6,414,401 B1
(45) Date of Patent: Jul. 2, 2002

(54) REGENERATION CONTROL SYSTEM AND METHOD OF HYBRID VEHICLE

(75) Inventors: Shigetaka Kuroda; Atsushi Matsubara; Atsushi Izumiura; Shinichi Kitajima; Teruo Wakashiro; Kazutomo Sawamura, all of Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 83 days.

(21) Appl. No.: 09/679,886

(22) Filed: Oct. 5, 2000

(30) Foreign Application Priority Data

Oct. 8, 1999 (JP) .......................................... 11-288752

(51) Int. Cl.[7] .............................................. F02H 11/00
(52) U.S. Cl. ..................... 290/40 C; 180/65.2; 318/376
(58) Field of Search ...................... 290/40 C, 40 A, 290/40 B; 180/65.2, 65.8; 318/376, 139

(56) References Cited

U.S. PATENT DOCUMENTS

| | | | | |
|---|---|---|---|---|
| 5,839,800 A | * | 11/1998 | Koga et al. .................. 188/156 |
| 6,177,773 B1 | * | 1/2001 | Nakano et al. ............. 180/65.2 |
| 6,262,491 B1 | * | 7/2001 | Kitajima et al. ............ 180/65.2 |
| 6,290,012 B1 | * | 9/2001 | Matsubara et al. ......... 180/65.3 |
| 6,314,346 B1 | * | 11/2001 | Kitajima et al. ........... 180/65.1 |
| 6,316,842 B1 | * | 11/2001 | Kuroda et al. ............. 180/65.4 |
| 6,318,487 B2 | * | 11/2001 | Yanase et al. .............. 180/65.2 |
| 6,329,775 B1 | * | 12/2001 | Matsubara et al. ......... 180/65.2 |
| 6,334,079 B1 | * | 12/2001 | Matsubara et al. ......... 180/65.1 |
| 2001/0020554 A1 | * | 9/2001 | Yanase et al. .............. 180/65.3 |

FOREIGN PATENT DOCUMENTS

JP  07-123509  5/1995

\* cited by examiner

*Primary Examiner*—Nicholas Ponomarenko
(74) *Attorney, Agent, or Firm*—Armstrong, Westerman & Hattori, LLP

(57) ABSTRACT

A regeneration control system and method applied to a hybrid vehicle is disclosed, by which sufficient energy can be stored during deceleration regeneration, and engine stall can be prevented when the amount of load imposed on the engine increases during deceleration regeneration. The method includes (i) determining a quantity of regeneration performed using the motor during deceleration of the vehicle, and for making the motor execute regeneration based on the determined quantity; (ii) detecting a variation (decrement) of the engine speed; (iii) detecting the engine speed, and (iv) stopping regeneration executed by the motor during deceleration of the vehicle if the detected variation of the engine speed is larger than a predetermined value, or if the detected engine speed is equal to or below a predetermined value.

8 Claims, 4 Drawing Sheets

REGENERATION CONTROL SYSTEM AND METHOD OF HYBRID VEHICLE

BACKGROUND OF THE INVENTION

1. Field of the Invention

The present invention relates to a regeneration control system and method of a hybrid vehicle which is driven by an engine and an electric motor, and in particular, relates to a system and method for preventing engine stall due to a sudden decrease of the engine speed during deceleration regeneration.

2. Description of the Related Art

Conventionally, a hybrid vehicle having not only an engine but also an electric motor as the drive source is known.

As a hybrid vehicle, a parallel hybrid vehicle is known that uses an electric motor as an auxiliary drive source for assisting the engine output. In the parallel hybrid vehicle, typically, operating the engine is assisted using the electric motor during the accelerating operation, while during the decelerating operation, the battery and the like are charged via a regenerating operation, that is, "deceleration regeneration" is performed. According to various control operations including the above, the remaining capacity (called as "state of charge", hereinafter) of the battery is maintained while also satisfying the driver's demands. An example thereof is disclosed in Japanese Unexamined Patent Application, First Publication, No. Hei 7-123509.

In such a conventional parallel hybrid vehicle, regenerated power obtained during deceleration can be stored so that the energy, which has been wastefully discharged, can be effectively used. It is profitable in power management. However, regeneration imposes a load on the engine. Therefore, when the engine (rotation) speed suddenly decreases during deceleration regeneration, if an excessive load generated by regeneration is imposed on the engine, then the engine may stall. If regeneration operation is significantly limited in order to solve such a situation, the amount of energy to be stored by executing regeneration is reduced and another means for increasing power generation is necessary. It is not profitable for reducing fuel consumption.

SUMMARY OF THE INVENTION

In consideration of the above circumstances, an objective of the present invention is to provide a regeneration control system and method applied to a hybrid vehicle, by which sufficient energy can be stored during deceleration regeneration, and engine stall can be prevented when the amount of load imposed on the engine increases during deceleration regeneration.

Therefore, the present invention provides a regeneration control system of a hybrid vehicle, wherein:
said hybrid vehicle comprises:
  an engine for outputting force for driving the vehicle;
  an electric motor for assisting the output from the engine; and
  a battery device (refer to battery 3 in the embodiment of the present invention, later explained) for supplying electric power to the motor, and
said regeneration control system comprising:
  a regeneration control section (refer to a motor ECU 1 in the embodiment) for determining a quantity of regeneration (refer to a final charge command value REGENF in the embodiment) performed using the motor during deceleration of the vehicle, and for making the motor execute regeneration based on the determined quantity;
  an engine speed variation detecting section (refer to an FIECU 11 in the embodiment) for detecting a variation (refer to decrement DNE of the engine speed in the embodiment) of the engine speed; and
  a regeneration stopping section for stopping regeneration executed by the motor during deceleration of the vehicle (for example, via a process of step S101 in the embodiment) if the variation of the engine speed detected by the engine speed variation detecting section is larger than a predetermined value (refer to a predetermined value #DNRGNCUT in the embodiment).

The present invention also provides a regeneration control method of a similar hybrid vehicle (comprising the above-explained engine, electric motor, and battery device), comprising the steps of:
  determining a quantity of regeneration performed using the motor during deceleration of the vehicle, and for making the motor execute regeneration based on the determined quantity;
  detecting a variation of the engine speed; and
  stopping regeneration executed by the motor during deceleration of the vehicle if the detected variation of the engine speed is larger than a predetermined value.

Accordingly, if it is determined that the variation of the engine speed, which decreases during deceleration regeneration, is larger than the predetermined value, that is, if it is determined that the load imposed on the engine in regeneration is large with respect to the possible range of the engine speed (the engine may stall even if the engine speed is sufficiently high), the regeneration can be stopped, thereby removing the load imposed on the engine in regeneration. Therefore, engine stall can be prevented.

The regeneration control system may further comprise an engine speed detecting section (refer to an engine speed sensor S2 in the embodiment) for detecting the engine speed. In this case, the regeneration stopping section may stop regeneration executed by the motor during deceleration of the vehicle if the variation of the engine speed detected by the engine speed variation detecting section is larger than a predetermined value, or if the engine speed detected by the engine speed detecting section is equal to or below a predetermined value (refer to a predetermined value #NERGNCUT in the embodiment).

Similarly, the regeneration control method may further comprise the step of detecting the engine speed. In this case, it is possible to stop regeneration executed by the motor during deceleration of the vehicle if the detected variation of the engine speed is larger than a predetermined value, or if the detected engine speed is equal to or below a predetermined value.

Accordingly, even when the variation of the engine speed, which decreases during deceleration regeneration, is equal to or below the predetermined value, if the engine speed is equal to or below the predetermined value, that is, if the engine cannot independently rotate, then regeneration can be stopped and the load imposed on the engine in regeneration can be omitted. Therefore, engine stall can be prevented.

In the regeneration control system comprising such an engine speed detecting section, the regeneration stopping section may stop regeneration executed by the motor during deceleration of the vehicle if the variation of the engine speed detected by the engine speed variation detecting section is larger than a predetermined value, and if the engine speed detected by the engine speed detecting section is equal to or below a predetermined value.

Similarly, in the regeneration control method, it is possible to stop regeneration executed by the motor during deceleration of the vehicle if the detected variation of the engine speed is larger than a predetermined value, and if the detected engine speed is equal to or below a predetermined value.

Accordingly, if the variation of the engine speed, which decreases during deceleration regeneration, is larger than the predetermined value, and if the engine speed is equal to or below the predetermined value, then it is possible to further reliably determine the possibility of an engine stall; thus, the load imposed on the engine in regeneration can be omitted by stopping the regeneration. Therefore, engine stall can be prevented.

DESCRIPTION OF THE PREFERRED EMBODIMENTS

Hereinafter, an embodiment of the present invention will be explained referring to the figures.

Figure 1:
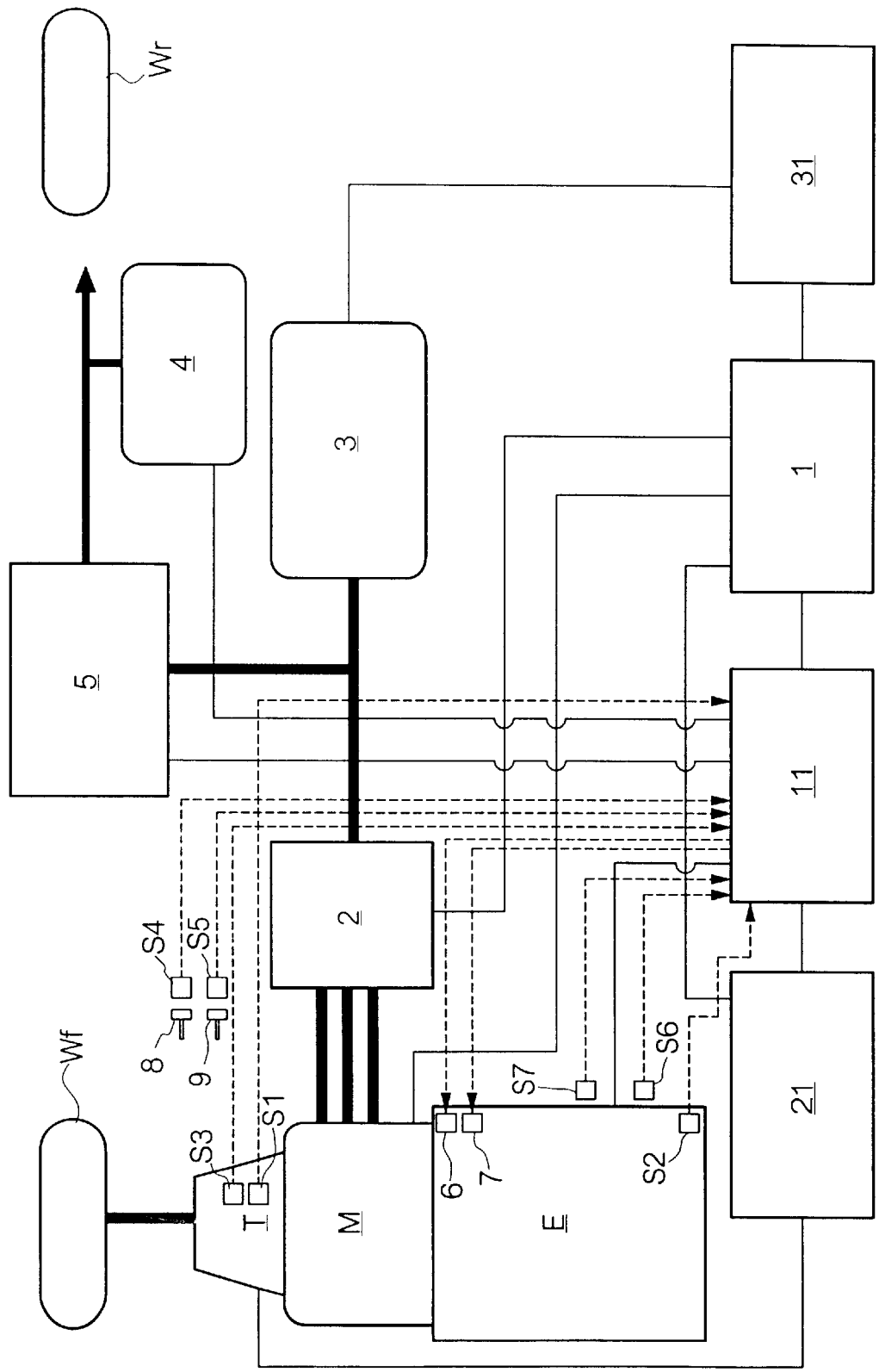
FIG. 1 is a block diagram showing the general structure of the hybrid vehicle comprising the regeneration control system as an embodiment according to the present invention.

FIG. 1 is a block diagram illustrating a parallel hybrid vehicle in which the embodiment of the present invention is applied, and the vehicle comprises an engine E and an electric motor M. The driving force generated by both the engine E and electric motor M is transmitted via automatic or manual transmission T to the driving wheels (here, front wheels) Wf. At the time of the deceleration of the hybrid vehicle, the driving force is transmitted from the driving wheels Wf to the electric motor M, the electric motor M functions as a generator for generating what is termed regenerative braking force, that is, the kinetic energy of the vehicle body is recovered and stored as electric energy.

The driving of the motor M and the regenerating operation of the motor M are controlled by a power drive unit 2 according to control commands from a motor ECU 1. A high voltage battery 3 for sending and receiving electric energy to and from the motor M is connected to the power drive unit 2. The battery 3 includes a plurality of modules connected in series, and in each module, a plurality of cells are connected in series. The hybrid vehicle includes a 12-V auxiliary battery 4 for driving various accessories. The auxiliary battery 4 is connected to the battery 3 via a downverter 5. The downverter 5, controlled by an FIECU 11, reduces the voltage from the battery 3 so as to charge the auxiliary battery 4.

The FIECU 11 controls, in addition to the motor ECU 1 and the downverter 5, a fuel supply amount controller 6 for controlling the amount of fuel supplied to the engine E, a starter motor 7, and ignition timing, etc. Therefore, the FIECU 11 receives (i) a signal from a speed sensor S1 for detecting vehicle speed V based on the rotation speed of the drive shaft of transmission T, (ii) a signal from an engine (rotational) speed sensor S2 for detecting engine (rotational) speed NE, (iii) a signal from a shift position sensor S3 for detecting the shift position of the transmission T, (iv) a signal from a brake switch S4 for detecting operation of a brake pedal 8, (v) a signal from a clutch switch S5 for detecting the operation of a clutch pedal 9, (vi) a signal from a throttle opening-degree sensor S6 for detecting the degree of throttle (valve) opening TH, and (vii) a signal from an air-intake passage pressure sensor S7 for detecting the air-intake passage (negative) pressure PB.

In FIG. 1, a CVTECU 21 controls the CVT (continuously variable transmission), a battery ECU 31 protects the battery 3, and calculates the state of charge (remaining capacity) SOC of the battery 3.

This hybrid vehicle can enter various control modes, such as an "idle mode", a "deceleration mode", an "acceleration mode", and a "cruise mode".

Determination of Motor Control Mode

Figure 2:
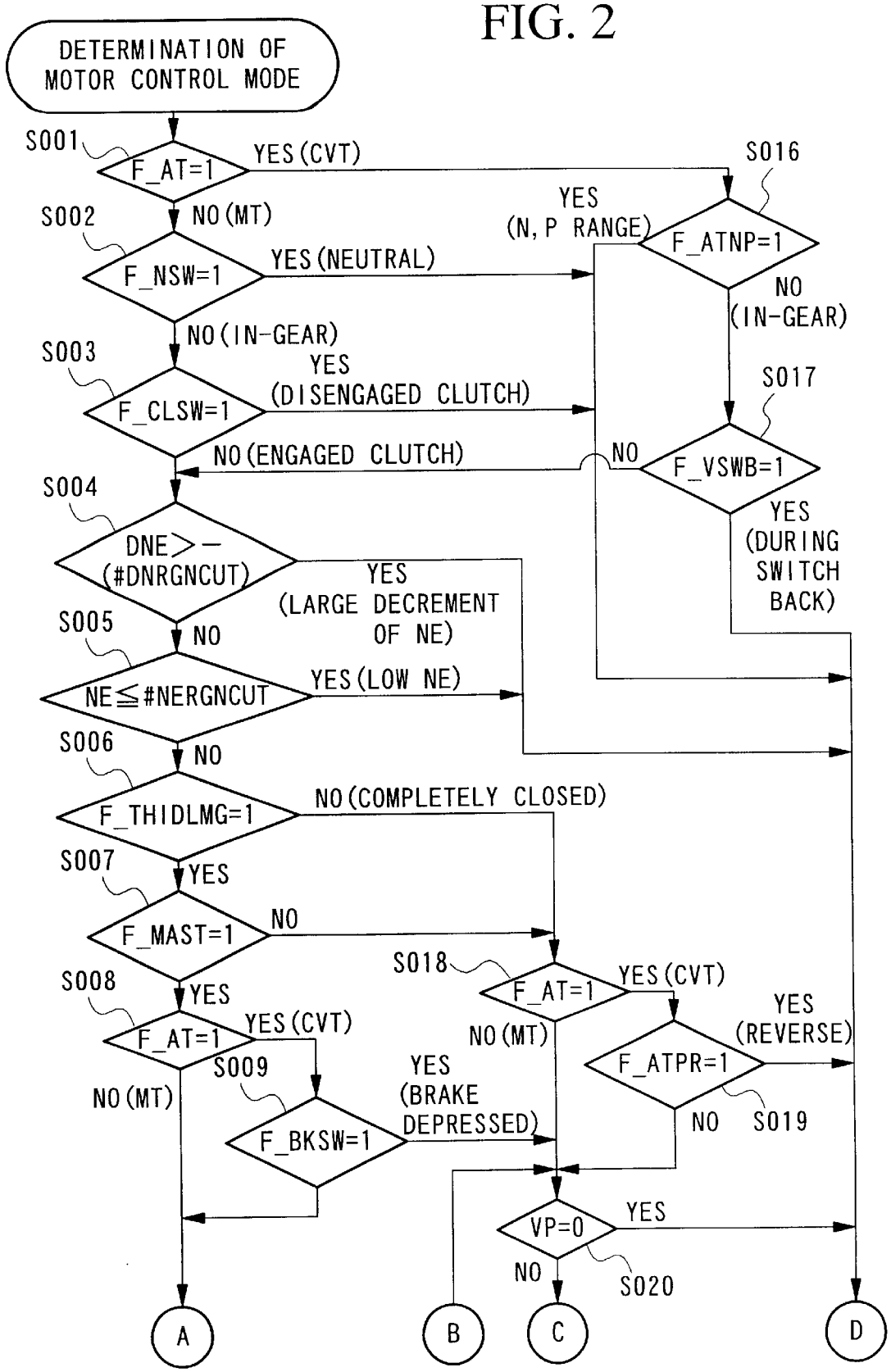
FIG. 2 is a flowchart showing the operation for determining the motor operation mode.
Figure 3:
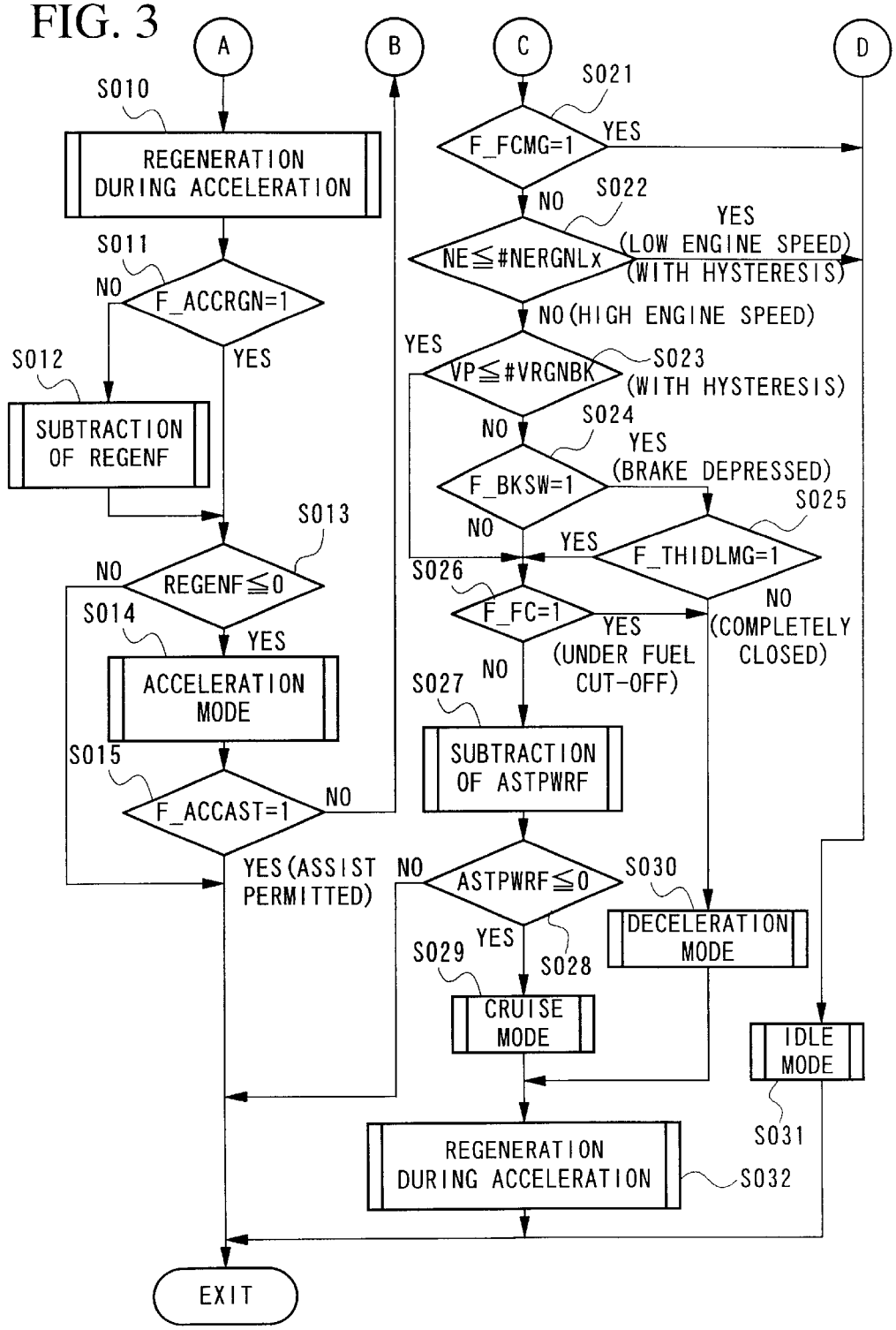
FIG. 3 is also a flowchart showing the operation for determining the motor operation mode.

Referring to the flowchart shown in FIGS. 2 and 3, the process for determining the above four motor control modes will be explained.

First, in step S001, it is determined whether the value of flag F_AT is 1. The flag F_AT is provided for determining whether the transmission is CVT (continuous variable transmission) or MT (manual transmission). If the result of the determination in step S001 is "NO", that is, if it is determined that the vehicle employs an MT, the operation proceeds to step S002. If the result of the determination in step S001 is "YES", that is, if it is determined that the vehicle employs a CVT, the operation jumps to step S016, where it is determined whether the value of flag F_ATNP is 1. The flag F_ATNP is provided for determining the in-gear state of CVT. If the result of the determination in step S016 is "NO", that is, if it is determined that the CVT is in the in-gear state, then in step S017, it is further determined whether the value of flag F_VSWB is 1. Here, the flag F_VSWB is provided for determining whether the switch back operation is currently executed (that is, the shift lever is being operated). If the result of the determination in step S017 is "NO", that is, if it is determined that the switch back is currently not being executed, then the operation proceeds to step S004. If the result of the determination in step S017 is "YES", that is, if it is determined that the switch back is currently being executed, then the operation jumps to step S031, where the control mode is switched to the idle mode, and the control operation of this flow is terminated. In the idle mode, the fuel supply is restarted after the fuel cut-off, and the engine E is maintained in the idle (or idling) state.

If the result of the determination in step S016 is "YES", that is, if it is determined that the CVT is in the N (neutral) or P (parking) range, the operation jumps to step S031.

In step S002, it is determined whether the value of flag F_NSW is 1. The flag F_NSW is provided for determining whether a neutral position is currently selected. If the result of the determination in step S002 is "YES", that is, if it is determined that a neutral position is currently selected, then the operation jumps to step S031. If the result of the determination in step S002 is "NO", that is, if it is determined that the current state is the in-gear state, then the operation proceeds to step S003, where it is determined whether the value of flag F_CLSW is 1. The flag F_CLSW is provided for determining whether the clutch is currently disengaged. If the result of the determination is "YES", that is, if it is determined that the clutch is currently disengaged, then the operation jumps to step S031, while if the result of the determination in step S003 is "NO", that is, if it is determined that the clutch is being engaged, then the operation proceeds to step S004.

In step S004, it is determined whether variation DNE of the engine speed NE is equal to or above a predetermined value #DNRGNCUT (e.g., 100 rpm). In this determination, each variation between successive TDCs (top dead centers) is analyzed. If the result of the determination is "YES", that is, if it is determined that the variation of the engine speed, more specifically, the decrement of the engine speed is larger than the predetermined value #DNRGNCUT, then the engine speed has been considerably decreased and the operation jumps to step S031. If the result of the determination in step S004 is "NO", that is, if it is determined that the variation (i.e., decrement) of the engine speed is equal to or below the predetermined value #DNRGNCUT, then the operation proceeds to step S005.

In step S005, it is determined whether the engine speed NE is equal to or below a predetermined value #NERGNCUT (e.g., 500 rpm). Here, this predetermined value is lower than the idle rotation speed but a little higher than a rotation speed by which the engine can independently become active again. If the result of the determination in step S005 is "YES", that is, if it is determined that the engine speed NE is equal to or below the predetermined value #NERGNCUT, then the operation jumps to step S031. If the result of the determination in step S005 is "NO", that is, if it is determined that the engine speed NE is larger than the predetermined value #NERGNCUT, then the operation proceeds to step S006.

In step S006, it is determined whether the value of flag F_THIDLMG is 1. The flag F_THIDLMG is provided for determining the idle state. If the result of the determination is "NO", that is, if it is determined that the degree of throttle opening is minimum (i.e., completely closed), then the operation jumps to step S018. If the result of the determination in step S006 is "YES", that is, if it is determined that the throttle is not completely closed, then the operation proceeds to step S007, where it is determined whether the value of flag F_MAST is 1. This flag F_MAST is provided for determining whether the motor is assisting the motor output.

If the result of the determination in step S007 is "NO", the operation jumps to step S018, while if the result of the determination in step S007 is "YES", then the operation proceeds to step S008.

In step S018, it is determined whether the value of flag F_AT (for determining the MT/CVT) is 1. If the result of the determination is "NO", that is, if it is determined that the present vehicle employs an MT, then the operation proceeds to step S020. If the result of the determination in step S018 is "YES", that is, if it is determined that the present vehicle employs a CVT, then the operation proceeds to step S019. In step S019, it is determined whether the value of flag F_ATPR is 1. This flag F_ATPR is provided for determining whether the current position of the CVT is a reverse position. If the result of the determination is "YES", that is, if it is determined that the current position is the reverse position, then the operation jumps to step S031. If the result of the determination in step S019 is "NO", that is, if it is determined that the current position is another position, then the operation proceeds to step S020.

In step S008, it is determined whether the value of flag F_AT (for determining the MT/CVT) is 1. If the result of the determination is "NO", that is, if it is determined that the present vehicle employs an MT, then the operation proceeds to step S010, where regeneration operation is executed during acceleration under some conditions. The operation then proceeds to step S011. In step S011, it is determined whether the value of flag F_ACCRGN is 1. This flag F_ACCRGN is provided for determining whether the regeneration is being executed during acceleration. If the result of the determination is "YES", that is, if it is determined that regeneration is being executed during acceleration, then the operation proceeds to step S013. If the result of the determination in step S011 is "NO", that is, if it is determined that regeneration is not currently executed during acceleration, then the operation proceeds to step S012, where subtraction of a final charge command value REGENF is executed. Here, the final charge command value REGENF indicates the amount of charge to be executed, and value 0 indicates charge is not executed. The operation then proceeds to step S013, where it is determined whether the final charge command value REGENF is equal to or below 0. If it is determined that the final charge command value REGENF is larger than 0, then the operation of the present flow is completed. If it is determined, in step S013, that the final charge command value REGENF is equal to or below 0, then the operation proceeds to step S014, where control suitable for the acceleration mode is executed. In the next step S015, it is determined whether the value of flag F_ACCAST is 1. This flag F_ACCAST is provided for determining whether the engine assisting operation is permitted. If the result of the determination is "YES", then the operation of this flow is completed. If the result of the determination in step S015 is "NO", that is, if the value of flag F_ACCAST is 0, then the operation proceeds to step S020. Here, in the above acceleration mode, the engine driving operation is assisted by using motor M.

If the result of the determination in step S008 is "YES", that is, if it is determined that the vehicle employs a CVT, then the operation proceeds to step S009, where it is determined whether the value of flag F_BKSW is 1. This flag F_BKSW is provided for determining whether the brake is being depressed. If the result of the determination is "YES", that is, if it is determined that the brake is being depressed, then the operation jumps to step S020. If the result of the determination in step S009 is "NO", that is, if it is determined that the brake is not currently depressed, then the operation proceeds to step S010.

In step S020, it is determined whether vehicle speed VP (detected for controlling the engine) is 0. If the result of the determination is "YES", that is, if it is determined that the vehicle speed VP is 0, then the operation jumps to step S031. If the result of the determination in step S020 is "NO", that is, if it is determined that the vehicle speed VP is not 0, then the operation proceeds to step S021. Instep S021, it is determined whether the value of flag F_FCMG is 1. This flag F_FCMG is provided for determining whether the control of stopping the engine is being performed. If the result of the determination in step S021 is "NO", then the operation proceeds to step S022. If the result of the determination in step S021 is "YES", then the operation jumps to step S031.

In step S022, the engine speed NE is compared with a lower limit engine speed #NERGNLx predetermined for the cruise/deceleration mode. Here, the "x" in #NERGNLx indicates each gear, that is, the lower limit engine speed is predetermined for each gear in consideration of hysteresis.

If it is determined, in step S022, that engine speed NE≦lower limit engine speed #NERGNLx, that is, if it is determined that the engine speed is relatively low, then the operation jumps to step S031. If it is determined, in step S022, that engine speed NE>lower limit engine speed #NERGNLx, that is, if it is determined that the engine speed is relatively high, then the operation proceeds to step S023.

In step S023, it is determined whether the above vehicle speed VP is equal to or below a lower limit vehicle speed

VRGNBK predetermined for determining the brake operation in the deceleration mode. If the result of the determination is "YES", then the operation jumps to step S026, while if the result of the determination in step S023 is "NO", then the operation proceeds to step S024.

In step S024, it is determined whether the value of the above-explained flag F_BKSW for determining the brake state is 1. If the result of the determination in step S024 is "YES", that is, if it is determined that the brake is being depressed, then the operation proceeds to step S025. If the result of the determination in step S024 is "NO", that is, if it is determined that the brake is not currently being depressed, the operation jumps to step S026.

In step S025, it is determined whether the value of flag F_THIDLMG is 1. This flag F_THIDLMG is provided for determining the idle state. If the result of the determination is "NO", that is, if it is determined that the throttle is completely closed, then the operation jumps to step S030 (where the control suitable for the deceleration mode is performed), and in the next step S032, the above-explained regeneration operation, executed under some conditions during acceleration, is performed, and the control operation of this flow is completed. In the deceleration mode, regenerative braking operation using motor M is executed. If the result of the determination in step S025 is "YES", that is, if it is determined that the throttle is not completely closed, then the operation proceeds to step S026.

Figure 4:
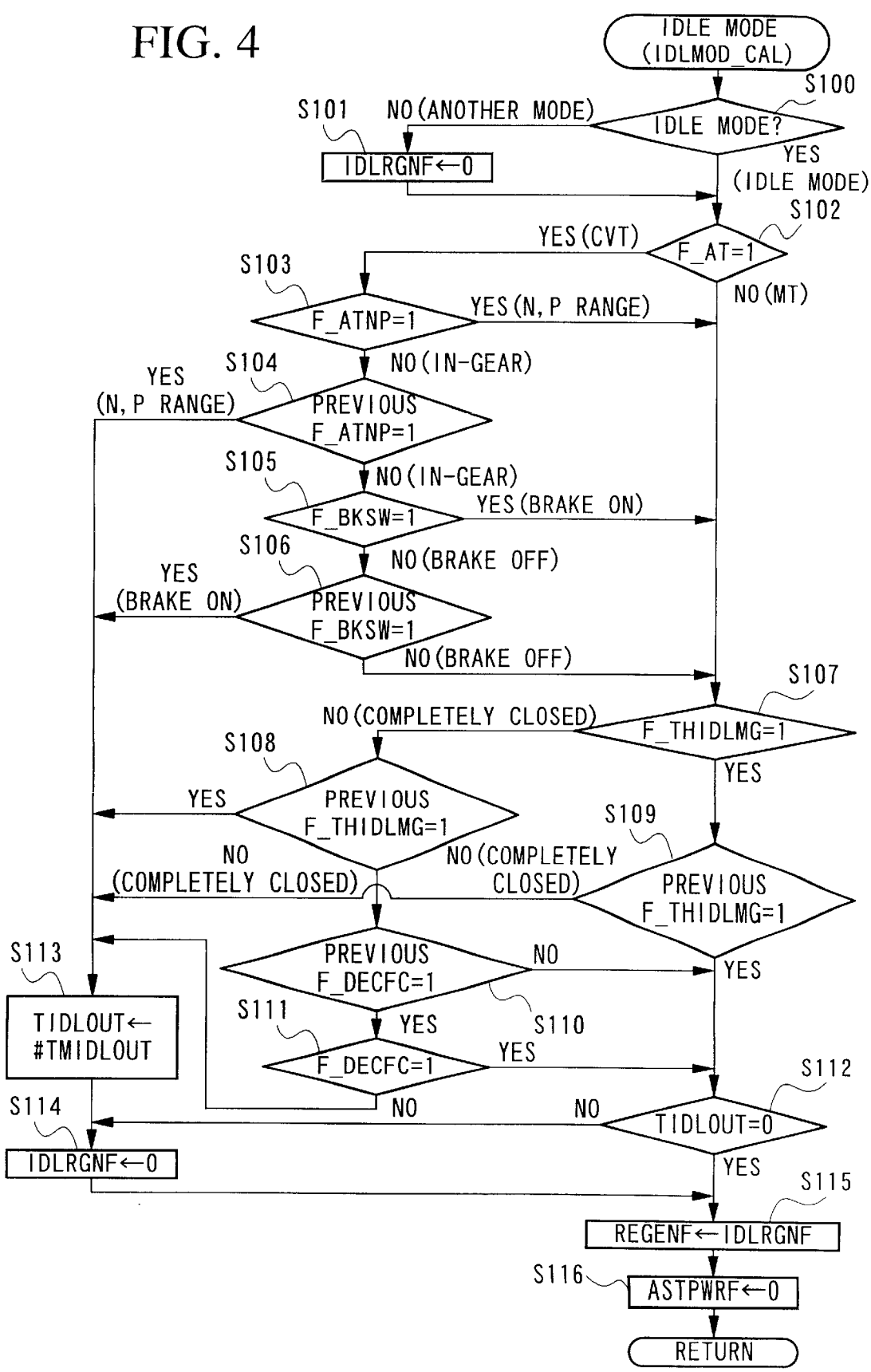
FIG. 4 is a flowchart showing the operation of the idle mode.

In step S026, it is determined whether the value of flag F_FC is 1. This flag F_FC is provided for determining whether the fuel cut-off is being executed. If the result of the determination is "YES", that is, if it is determined that the fuel cut-off is being executed, then the operation jumps to step S030. If the result of the determination in step S026 is "NO", then the operation proceeds to step S027, where subtraction of a final assist command value ASTPWRF is performed. Here, the final assist command value ASTPWRF indicates power to provide assistance, and value 0 indicates the assisting operation is not executed. In the next step S028, it is determined whether the final assist command value ASTPWRF is equal to or below 0. If it is determined that ASTPWRF is equal to or below 0, then the operation proceeds to step S029, where control suitable for the cruise mode is performed. In this cruise mode, motor M is not driven, and the vehicle is driven using the driving force of engine E. The operation then jumps to step S032. If it is determined, in step S028, that the final assist command value ASTPWRF is larger than 0, then the control operation of this flow is completed. Idle mode Below, the control of the idle mode will be explained based on the flowchart of FIG. 4.

In step S100, it is determined whether the current mode is the idle mode. If it is determined that the current mode is the idle mode, then the operation proceeds to step S102. If it is determined, in step S100, that the current mode is another mode, then in step S101, a final idle charge command value IDLRGNF is set to 0, and the operation proceeds to step S102. Accordingly, if the current idle mode has started from another mode (other than the idle mode), no charge operation is performed in the idle mode.

In step S102, it is determined whether the value of the flag F_AT is 1. If the result of the determination is "NO", that is, if it is determined that the vehicle employs an MT, then the operation jumps to step S107. If the result of the determination in step S102 is "YES", that is, if it is determined that the vehicle employs a CVT, then the operation proceeds to step S103. In step S103, it is determined whether the value of the flag F_ATNP (for determining the in-gear state of CVT) is 1. If the result of the determination in step S103 is "YES", that is, if it is determined that the CVT is in the N or P range, then the operation jumps to step S107. If the result of the determination in step S103 is "NO", that is, if the CVT is in the in-gear state, then in the next step S104, it is determined whether the previous value of the above flag F_ATNP, that is, the flag value in the last (operation) turn of this flow, is 1. If the result of the determination is "YES", that is, if it was determined in the last turn that the CVT was in the N or P range, then the operation jumps to step S113.

In step S113, the timer value of a non-idle mode selecting timer TIDLOUT for maintaining the non-idle state for a predetermined time is set to a predetermined value #TMIDLOUT. The operation then proceeds to step S114, where the final idle charge command value IDLRGNF is set to 0. In the next step S115, the final charge command value REGENF is set to the final idle charge command value IDLRGNF, and in the following step S116, the final assist command value ASTPWRF is set to 0. The control operation of this flow is then completed.

If the result of the determination in step S104 is "NO", that is, if it was determined in the last turn that the CVT was in the in-gear state (in the last turn), then in the next step S105, it is determined whether the value of the flag F_BKSW is 1. If the result of the determination is "YES", that is, if it is determined that the brake is being depressed, then the operation proceeds to step S107. If the result of the determination in step S105 is "NO", that is, if it is determined that the brake is not currently being depressed, then the operation proceeds to step S106.

In step S106, the previous value of flag F_BKSW (i.e., the flag value in the last turn) is 1. If the result of the determination in step S106 is "YES", that is, if it was also determined that the brake was being depressed, then the operation jumps to step S113. If the result of the determination in step S106 is "NO", that is, if it was determined in the last turn that the brake was not being depressed in the last turn, then the operation proceeds to step S107.

In step S107, it is determined whether the value of the above-explained flag F_THIDLMG is 1. If the result of the determination is "NO", that is, if it is determined that the throttle is completely closed, then the operation proceeds to step S108. If the result of the determination in step S107 is "YES", that is, if it is determined that the throttle is not completely closed, then the operation proceeds to step S109. In step S108, it is determined whether the previous value of the flag F_THIDLMG in the last turn is 1. If the result of the determination is "NO", that is, if it was determined in the last turn that the throttle was completely closed in the last determination, the operation proceeds to step S110. If the result of the determination in step S108 is "YES", that is, if it was determined in the last turn that the throttle was not completely closed, then the operation jumps to step S113.

Also in step S109, it is determined whether the previous value of the flag F_THIDLMG in the last turn was 1. If the result of the determination is "NO", that is, if it was determined in the last turn that the throttle was completely closed in the last determination, the operation proceeds to step S113. If the result of the determination in step S109 is "YES", that is, if it was determined in the last turn that the throttle was not completely closed, then the operation jumps to step S112. In step S110, it is determined whether the previous value of flag F_DECFC is 1. This flag F_DECFC is provided for determining whether the fuel cut-off is being executed during deceleration. If the result of the determination is "YES", that is, if the flag value is 1, then in the next step S111, it is determined whether the current value of the flag F_DECFC is 1. If the result of the determination in step S110 is "NO", that is, if the flag value is 0, then the operation proceeds to step S112.

If the result of the determination in step S111 is "YES", that is, if the relevant flag value is 1, then the operation proceeds to step S112. If the result of the determination in step S111 is "NO", that is, if the relevant flag value is 0, then the operation proceeds to step S113.

In step S112, it is determined whether the non-idle mode selecting timer TIDLOUT is 0. If the result of the determination is "YES", the operation proceeds to step S115. If the result of the determination instep S112 is "NO", then the operation proceeds to step S114.

According to the above embodiment, when the mode is the deceleration mode and the vehicle employing an MT (i.e., MT vehicle) is in the in-gear state (corresponding to "NO" in step S002) and the clutch is engaged (corresponding to "NO" in step S003), if the decrement DNE of the engine speed is large (corresponding to "YES" in step S004), or if the engine speed NE is low (corresponding to "YES" in step S005), then the control operation jumps to step S031 (i.e., idle mode). In this case, the idle mode, shifting from the deceleration mode, is started; thus, the charge operation in the idle mode (i.e., idle charge) is prohibited (i.e., the final idle charge command value IDLRGNF is set to 0 in step S101). Therefore, it is possible to prevent engine stall due to a load generated by idle charge.

In addition, when the vehicle employs a CVT (i.e., CVT vehicle) and deceleration regeneration is executed, if the CVT is in the in-gear state (corresponding to "NO" in step S016) and switch back is not executed (corresponding to "NO" in step S017), then the idle charge is also stopped under similar conditions relating to the engine speed NE and its decrement DNE (that is, if the decrement DNE is large or the engine speed NE is low). Therefore, similar to the MT vehicle, it is possible not to generate a load imposed on the engine and to prevent engine stall.

In addition, when the vehicle is an MT vehicle and deceleration regeneration is executed, if the vehicle is in the in-gear state (corresponding to "NO" in step S002) and the clutch is disengaged (corresponding to "YES" in step S003), then a load due to regeneration is directly imposed on the engine. Similarly, when the vehicle is a CVT vehicle and deceleration regeneration is executed, if the CVT is in the N or P range (corresponding to "YES" in step S016), or if the vehicle is in the in-gear state (corresponding to "NO" in step S016) and switch back is executed (corresponding to "YES" in step S017), then a load due to regeneration is directly imposed on the engine. However, in such cases, the idle charge is stopped in the above step S101 of the present embodiment; thus, engine stall can be prevented.

Therefore, deceleration regeneration can be stopped via a simple operation, and an be quickly stopped by determining whether deceleration regeneration is stopped during the early steps of the operation of determining the motor operation mode. In contrast, if deceleration regeneration is stopped via complicated conditions (for example, if the condition in which the clutch is depressed halfway is considered), deceleration regeneration cannot be stopped quickly and the engine may stall. Such unexpected engine stall caused by delayed stop of deceleration regeneration can be prevented by the control of the present embodiment.

The present invention is not limited to the above embodiment. For example, regeneration may be stopped only when the decrement of the engine speed is larger than a predetermined value and the engine speed is equal to or below a predetermined value. This is because some kinds of engine (i.e., having specific engine characteristics) may stall only according to the conditions relating to the decrement of the engine speed and the engine speed itself.

In addition, the rate of change of the engine speed may be detected and used instead of the variation of the engine speed.

What is claimed is:

1. A regeneration control system of a hybrid vehicle, wherein:

said hybrid vehicle comprises:
an engine for outputting force for driving the vehicle;
an electric motor for assisting the output from the engine; and
a battery device for supplying electric power to the motor, and said regeneration control system comprising:
a regeneration control section for determining a quantity of regeneration performed using the motor during deceleration of the vehicle, and for making the motor execute regeneration based on the determined quantity;
an engine speed variation detecting section for detecting a variation of the engine speed; and
a regeneration stopping section for stopping regeneration executed by the motor during deceleration of the vehicle if the variation of the engine speed detected by the engine speed variation detecting section is larger than a predetermined value.

2. A regeneration control system as claimed in claim 1, further comprising:

an engine speed detecting section for detecting the engine speed, and wherein:
the regeneration stopping section stops regeneration executed by the motor during deceleration of the vehicle if the variation of the engine speed detected by the engine speed variation detecting section is larger than a predetermined value, or if the engine speed detected by the engine speed detecting section is equal to or below a predetermined value.

3. A regeneration control system as claimed in claim 1, further comprising:

an engine speed detecting section for detecting the engine speed, and wherein:
the regeneration stopping section stops regeneration executed by the motor during deceleration of the vehicle if the variation of the engine speed detected by the engine speed variation detecting section is larger than a predetermined value, and if the engine speed detected by the engine speed detecting section is equal to or below a predetermined value.

4. A regeneration control system as claimed in any one of claims 1 to 3, wherein:

the variation detected by the engine speed variation detecting section is a decrement of the engine speed.

5. A regeneration control method of a hybrid vehicle, wherein:

said hybrid vehicle comprises:
an engine for outputting force for driving the vehicle;
an electric motor for assisting the output from the engine; and
a battery device for supplying electric power to the motor, and said regeneration control method comprising the steps of:
determining a quantity of regeneration performed using the motor during deceleration of the vehicle, and for making the motor execute regeneration based on the determined quantity;

detecting a variation of the engine speed; and stopping regeneration executed by the motor during deceleration of the vehicle if the detected variation of the engine speed is larger than a predetermined value.

6. A regeneration control method as claimed in claim 5, further comprising the step of:

detecting the engine speed, and wherein:

regeneration executed by the motor during deceleration of the vehicle is stopped if the detected variation of the engine speed is larger than a predetermined value, or if the detected engine speed is equal to or below a predetermined value.

7. A regeneration control method as claimed in claim 5, further comprising the step of:

detecting the engine speed, and wherein:

regeneration executed by the motor during deceleration of the vehicle is stopped if the detected variation of the engine speed is larger than a predetermined value, and if the detected engine speed is equal to or below a predetermined value.

8. A regeneration control method as claimed in any one of claims 5 to 7, wherein: the detected variation of the engine speed is a decrement.

* * * * *